(12) United States Patent
Der (10) Patent No.: US 8,327,080 B1
(45) Date of Patent: Dec. 4, 2012

(54) WRITE-BACK CACHE PROTECTION

(75) Inventor: Kenneth P. Der, Edmonton (CA)

(73) Assignee: EMC Corporation, Hopkinton, MA (US)

( * ) Notice: Subject to any disclaimer, the term of this patent is extended or adjusted under 35 U.S.C. 154(b) by 176 days.

(21) Appl. No.: 12/892,081

(22) Filed: Sep. 28, 2010

(51) Int. Cl.
*G06F 12/08* (2006.01)

(52) U.S. Cl. .. 711/143; 711/141; 711/144; 711/E12.017

(58) Field of Classification Search .................. 711/143, 711/141, 144, E12.017
See application file for complete search history.

(56) References Cited

U.S. PATENT DOCUMENTS

| | | | |
|---|---|---|---|
| 7,398,459 B2 | 7/2008 | Park et al. | |
| 7,606,980 B2 * | 10/2009 | Qureshi et al. | 711/144 |
| 8,006,126 B2 | 8/2011 | Deenadhayalan et al. | |
| 8,041,990 B2 | 10/2011 | O'Connor et al. | |
| 8,086,783 B2 | 12/2011 | O'Connor et al. | |
| 8,156,400 B1 | 4/2012 | Yeo et al. | |

* cited by examiner

*Primary Examiner* — Yong Choe
(74) *Attorney, Agent, or Firm* — BainwoodHuang (57) ABSTRACT

A technique protects host data. The technique involves receiving, at a local computerized node, a block of data from a host computer, the block of data including data sub-blocks. The technique further involves storing the block of data, as a dirty cache block, in a local cache of the local computerized node. The technique further involves performing a set of external caching operations to cache a set of sub-blocks in a set of external computerized nodes in communication with the local computerized node. Each external caching operation caches a respective sub-block of the set of sub-blocks in a cache of a respective external computerized node. The set of sub-blocks includes (i) the data sub-blocks of the block of data from the host and (ii) a set of checksums derived from the data sub-blocks of the block of data from the host.

20 Claims, 6 Drawing Sheets

WRITE-BACK CACHE PROTECTION

BACKGROUND

A conventional data storage cluster includes multiple data storage nodes and an array of magnetic disk drives, e.g., a redundant array of independent disks (RAID) group. Each data storage node writes host data into the array and reads host data from the array on behalf of one or more host computers. Some arrays include additional magnetic disk drives to hold error correcting checksums, e.g., for RAID 5, RAID 6 or Reed-Solomon RAID.

Each data storage node typically includes a processor and cache memory. When a data storage node receives a write command and host data to be written to the array from a host computer, the processor of that node stores the host data in the array and perhaps temporarily buffers the host data in the cache memory.

If the cluster is configured for write-back caching, the node's processor buffers the host data in the node's cache memory and acknowledges completion of the write command prior to flushing the host data from the node's cache memory to the array of magnetic disk drives. The node's processor may provide a full copy of the host data to a second data storage node so that, if the first data storage node were to fail prior to flushing the host data from its cache memory to the array of magnetic disk drives, the full copy of the host data can be retrieved from the cache memory of the second data storage node thus preventing loss of the host data. The cluster can be further provisioned to withstand a second node failure (e.g., loss of the host data if the second data storage node were to additionally fail) by configuring the node's processor to provide another full copy of the host data to the cache memory of yet another data storage node (e.g., another full copy of the host data to a third data storage node), and so on.

SUMMARY

Unfortunately, there are deficiencies to the above-described conventional write-back cache protection approach (hereinafter referred to as the "conventional naïve cache protection approach") in which a full copy of the cached host data is provided to one or more other data storage nodes to protect the host data during write-back caching. In particular, the conventional naïve cache protection approach consumes substantial bandwidth and cache memory space. For example, to provision a conventional data storage cluster to withstand two node failures without losing host data under the conventional naïve cache protection approach, a full copy of the host data must be transmitted from the original data storage node to two other data storage nodes (i.e., a bandwidth cost of 2x) and stored in the cache memory of each of the two other data storage nodes (i.e., a cache memory space cost of 2x). Similarly, to withstand three node failures without losing host data under the conventional naïve cache protection approach, a full copy of the host data must be transmitted from the original data storage node to three other data storage nodes (i.e., a bandwidth cost of 3x) and stored in the cache memory of each of the three other data storage nodes (i.e., a cache memory space cost of 3x), and so on.

In contrast to the above-described conventional naïve cache protection approach, improved techniques protect cached host data by distributing, among a set of nodes, only portions of the host data (i.e., host data sub-blocks) in combination with a set of checksums. In particular, to protect a block of host data, the techniques involve splitting the block of host data into N equally-sized, non-overlapping host data sub-blocks and computing M checksum sub-blocks from these N host data sub-blocks. The resulting N+M sub-blocks (i.e., N host data sub-blocks plus M checksum sub-blocks) are then spread across the set of nodes with each node caching one of the N+M sub-blocks. The M checksums are computed via application of error correcting mathematics so that each checksum sub-block is the same size as each host data sub-block and so that the entire block of host data can be reconstructed from any combination of N host data or checksum sub-blocks. Accordingly, the entire block of host data is capable of being recovered after a failure as long as there are at least N cached sub-blocks remaining. Furthermore, it will be demonstrated that such techniques can consume less bandwidth and less cache memory space vis-à-vis the conventional naïve cache protection approach.

It should be understood that Reed-Solomon coding is suitable for use by the improved cache protection techniques. Along these lines, the processing circuitry of the node which initially receives a block of host data can compute the M checksums using linear algebra over a Galois Field. That is, the processing circuitry of that node splits the block of host data into the N host data sub-blocks, and multiplies the host data sub-block vector with a Vandermonde matrix. Since the Vandermonde matrix guarantees a set of linearly independent equations, any N×N matrix made up of rows from the identity matrix and Vandermonde matrix is invertible and is the key property that allows any N host data or checksum sub-blocks to be used to recover the original host data sub-blocks. Linear Algebra over a Galois Field is performed using XOR operations for addition and subtraction. Furthermore, log addition and log subtraction are used for multiplication and division operations on the Galois Field.

Particular details for implementing suitable Reed-Solomon mathematics are described, for example, in a document entitled "A Tutorial on Reed-Solomon Coding for Fault-Tolerance in RAID-like Systems" by James S. Plank for the Department of Computer Science at the University of Tennessee, the entire teachings of which are hereby incorporated by reference. Additional details are described in a document entitled "The mathematics of RAID-6" by H. Peter Anvin (updated 21 May 2009), the entire teachings of which are hereby incorporated by reference.

By way of example, suppose that a data storage cluster has four data storage nodes $A(0)$, $A(1)$, $A(2)$ and $A(3)$ (i.e., the number of nodes X=4), and that the data storage cluster is configured to protect blocks of host data against a failure of two data storage nodes (hereinafter referred to as level 2 cache protection). Further suppose that node $A(0)$ receives a block B from a host computer for eventual writing out to magnetic disk drive storage.

In accordance with an embodiment of the improved technique, the node $A(0)$ safely caches the entire block B of host data in its local cache and splits the block B into two host data sub-blocks $b(1)$, $b(2)$ of equal size (i.e., each host data sub-block is a half block in size, and the number of host data sub-blocks N=2). The node $A(0)$ then computes a checksum $c(1)$ using Reed-Solomon coding (i.e., number of checksum sub-blocks M=1). In this situation, $c(1)=b(1)$ XOR $b(2)$. The node $A(0)$ then performs a set of caching operations to distribute sub-blocks $b(1)$, $b(2)$ and $c(1)$ among the other nodes $A(1)$, $A(2)$ and $A(3)$. Along these lines, node $A(1)$ caches sub-block $b(1)$, node $A(2)$ caches sub-block $b(2)$, and node $A(3)$ caches sub-block $c(1)$. Node $A(0)$ then acknowledges completion of the write to the host computer (i.e., write-back caching).

At this point, it should be understood that recovery of the cached host data is only necessary if the node $A(0)$ has failed.

That is, as long as the node A(0) is up and running under normal operation, the entire block B of host data is available from the cache memory of node A(0).

However, as mentioned above, data storage cluster is capable of losing up to two nodes (i.e., level 2 cache protection) while maintaining its ability to reconstruct the original host data block B using Reed-Solomon mathematics. In particular, if nodes A(0) and A(1) fail, the entire host data block B can be reconstructed from host data sub-block b(2) cached on node A(2) and checksum sub-block c(1) cached on node A(3). Additionally, if nodes A(0) and A(2) fail, the entire host data block B can be reconstructed from host data sub-block b(1) cached on node A(1) and checksum sub-block c(1) cached on node A(3). Furthermore, if nodes A(0) and A(3) fail, the entire host data block B can be reconstructed from host data sub-block b(1) cached on node A(1) and host data sub-block b(2) cached on node A(2).

It should be understood that the amount of consumed network bandwidth equals 1.5× the size of block B since sub-blocks b(1), b(2), c(1) were sent from node A(0) to nodes A(1), A(2), A(3), respectively. In contrast, the above-described conventional naïve cache protection approach would require 2× the size of the block B in network bandwidth to protect against a failure of two nodes, i.e., block B would be fully copied to two other nodes. Accordingly, the above-described embodiment of the improved technique uses less bandwidth for the same level of cache protection.

Furthermore, it should be understood that the amount of consumed cache memory space on other nodes equals 1.5× the size of block B since sub-blocks b(1), b(2), c(1) were cached on nodes A(1), A(2), A(3), respectively. In contrast, the above-described conventional naïve cache protection approach would require 2× the size of the block B in cache memory space on other nodes to protect against a failure of two nodes, i.e., block B would be fully cached on two other nodes. Accordingly, the above-described embodiment of the improved technique uses less cache memory space for the same level of cache protection.

One embodiment is directed to a method of protecting host data. The method includes receiving, at a local computerized node, a block of data from a host computer. The block of data includes data sub-blocks. The method further includes storing the block of data, as a dirty cache block, in a local cache of the local computerized node. The method further includes performing a set of external caching operations to cache a set of sub-blocks in a set of external computerized nodes in communication with the local computerized node. Each external caching operation caches a respective sub-block of the set of sub-blocks in a cache of a respective external computerized node. The set of sub-blocks includes (i) the data sub-blocks of the block of data from the host and (ii) a set of checksums derived from the data sub-blocks of the block of data from the host.

Other embodiments are directed to systems and apparatus for protecting host data. Other embodiments are directed to computer program products which enable protection of host data.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique protects cached host data by spreading, across a set of nodes, only portions of the host data (i.e., host data sub-blocks) in combination with a set of checksums (e.g., erasure codes). In particular, to protect a block of host data, the technique involves splitting the block of host data into N equally-sized, non-overlapping host data sub-blocks and computing M checksum sub-blocks from these N host data sub-blocks. The resulting N+M sub-blocks (i.e., N host data sub-blocks plus M checksum sub-blocks) are then distributed among the set of nodes with each node caching exactly one of the N+M sub-blocks. The M checksums are computed via application of error correcting mathematics (e.g., Reed-Solomon coding) so that the checksums are the same size as the host data sub-blocks and so that the entire block of host data can be reconstructed from any combination of N sub-blocks. Accordingly, the entire block of host data is capable of being recovered after a failure as long as there are at least N sub-blocks cached on the remaining nodes. Moreover, it will be demonstrated that such techniques can consume less bandwidth and less cache memory space vis-à-vis a conventional naïve cache protection approach.

Figure 1:
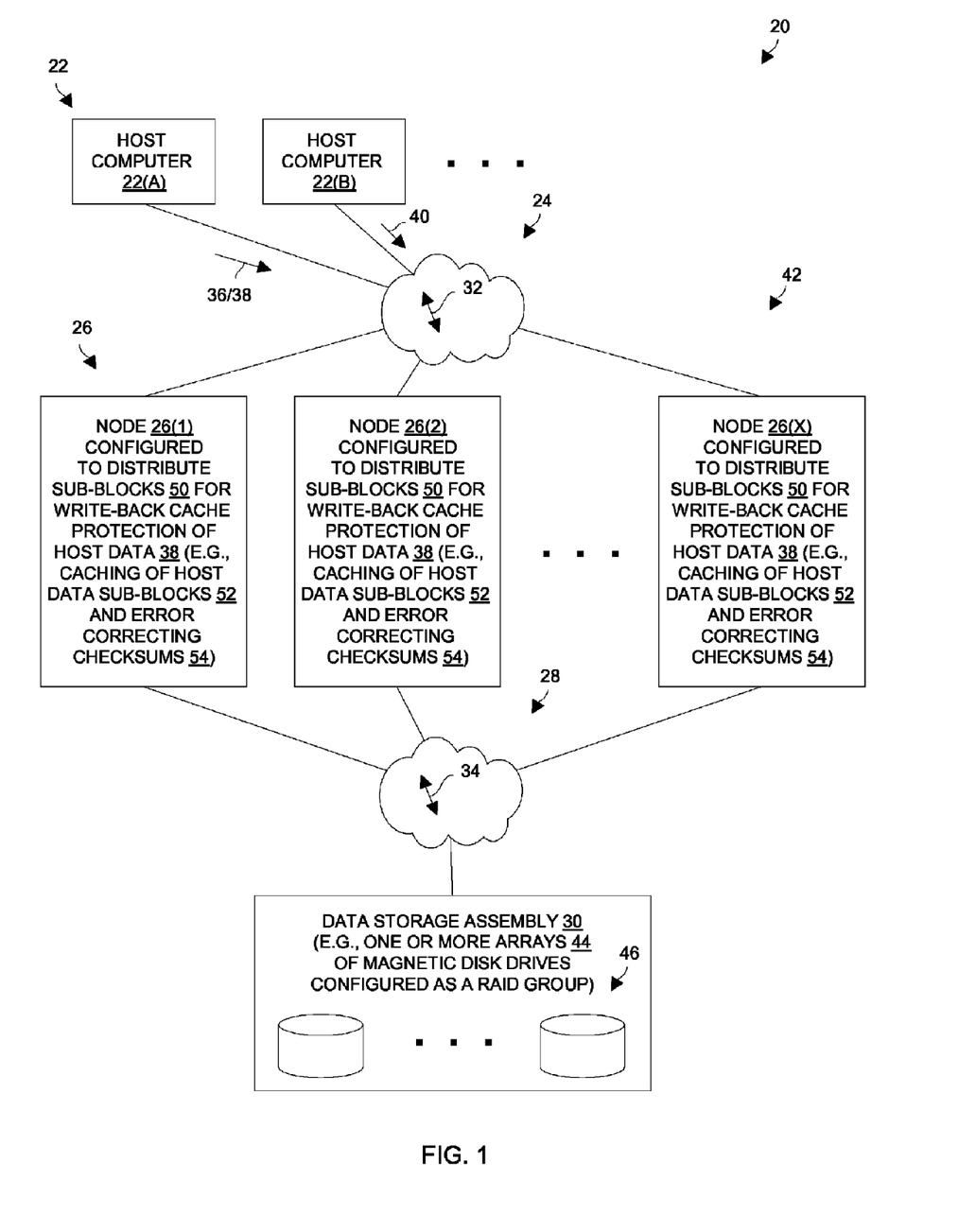
FIG. 1 is a block diagram of a data storage environment which provides write-back cache protection of host data.

FIG. 1 shows a data storage environment 20 which provides write-back cache protection of host data. The data storage environment 20 includes a set of host computers 22(A), 22(B), . . . (collectively, hosts 22), a front-end communications medium 24, a set of computerized nodes 26(1), 26(2), . . . 26(X) (collectively, computerized nodes 26), a back-end communications medium 28, and a data storage assembly 30.

The front-end communications medium 24 conveys electronic signals 32 between the hosts 22 and the nodes 26. Similarly, the back-end communications medium 28 conveys electronic signals 34 between the nodes 26 and the data storage assembly 30. Each communications medium 24, 28 may include various components (IP-based devices, block-based devices, cables, switches, gateways/bridges, other SAN/NAS communications devices and interfaces, combinations thereof, etc.) and have a variety of topologies (e.g., switched fabric, hub-and-spoke, ring/loop, backbone, multi-drop, point-to-point, irregular, combinations thereof, etc.).

In some arrangements, the communications media 24, 28 are isolated from each other. Such an arrangement enables at least portions of the communications media 24, 28 to exclusively handle different types of communications, e.g., the communications medium 24 may be a computer network (IP-based communications) while the communications medium 28 may be a storage network (block-based communications).

In other arrangements, the communications media 24, 28 are at least partially connected or overlap. Such an arrangement enables IP-based storage and block-based storage to be conveniently accessible by each node 26 via a single communications interface.

During operation, each host 22 is capable of sending write commands 36 and host data 38 to the nodes 26 to store the host data 38 in the data storage assembly 30 (e.g., see the host 22(A)). Similarly, each host 22 is capable of sending read commands 40 to the nodes 26 to read the host data 38 from the data storage assembly 30 (e.g., see the host 22(B)).

The nodes 26 preferably coordinate their operation as a data storage cluster 42. Along these lines, the nodes 26 are capable of load balancing their operations. Additionally, each node 26 is capable of filling in for another node 26 which has failed or become inoperative thus maintaining operation of the cluster 42 as a whole in a fault tolerant manner.

The data storage assembly 30 preferably includes one or more arrays 44 of magnetic disk drives 46 which stores the host data 38 in a non-volatile (i.e., persistent) manner. In some arrangements, multiple disk drives 46 are configured into one or more RAID groups which implement a particular RAID level to enable recovery of the host data 38 in the event of one or more disk drive failures (e.g., RAID 1, RAID 5, RAID 6, etc.).

It should be understood that the nodes 26 are configured to (i) perform write-back caching and (ii) protect cached host data 38 against node failures. That is, each node 26 of the cluster 42 is configured to acknowledge completion of a write command 36 after that node 26 caches the accompanying host data 38 but before writing that host data 38 to the data storage assembly 30. To prevent inadvertent loss of the host data 38 if that node 26 were to fail, that node 26 remotely caches respective sub-blocks 50 among the other nodes 26 of the cluster 42 before acknowledging the write command 36. The sub-blocks 50 include N equally-sized, non-overlapping host data sub-blocks 52 (i.e., sub-blocks of the actual host data 38) and M error correcting checksums 54 (i.e., erasure codes derived from the N host data sub-blocks). Once all of the N+M sub-blocks 50 have been distributed among the other nodes 26 of the cluster 42, up to M other nodes 26 as well as the node 26 storing the original block of host data 38 can fail. Even so, the entire block of host data 38 can be fully reconstructed from the remaining N sub-blocks 50 on the remaining nodes 26.

As will be explained in further detail shortly, Reed-Solomon mathematics is suitable for computing the M checksums 54 from N host data sub-blocks 52, as wells as fully reconstructing the host data 38 from any combination of N sub-blocks 50 (i.e., any combination of N host data sub-blocks 52 and checksum sub-blocks 54). Further details will now be provided with reference to FIG. 2.

Figure 2:
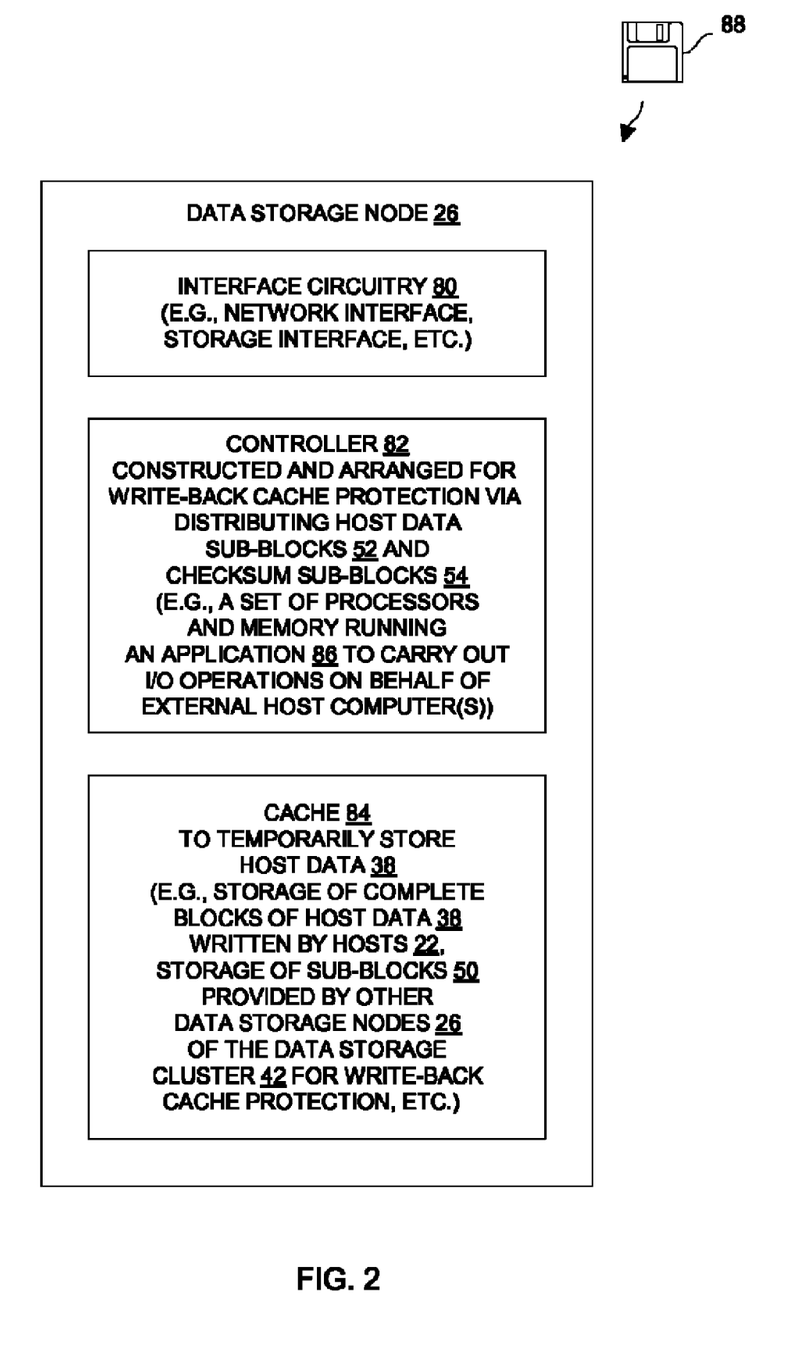
FIG. 2 is a block diagram of a data storage node of the data storage environment of FIG. 1.

FIG. 2 shows a data storage node 26 of the data storage environment 20. The data storage node 26 includes interface circuitry 80, a controller 82, and a cache 84. The interface circuitry 80 is constructed and arranged to enable the data storage node 26 to communicate with a variety of external devices (e.g., a network interface for TCP/IP based communications, a storage interface for block-based communications, etc.). The controller 82 is configured to perform input/output (I/O) operations (e.g., reads and writes) on behalf of one or more host computers 22 (also see FIG. 1). The cache 84 temporarily stores the host data 38 en route between the host computers 22 and the data storage assembly 30.

During operation, the controller 82 is constructed and arranged to coordinate operation of the node 26 with the other nodes 26 of the data storage cluster 42 and operate in a write-back caching mode. For example, when a host computer 22 attempts to write a block of host data 38 to the data storage assembly 30, the node 26 receives a write command 36 and the block of host data 38 from a host computer 22 (also see FIG. 1). In response to the write command 36, the controller 82 of the node 26 safely caches the block of host data 38 in the cache 84 as a dirty cache block. Additionally, the controller 82 splits the dirty cache block into N host data sub-blocks 52 and computes M checksums 54 from N host data sub-blocks 52. The controller 82 then distributes the N+M sub-blocks 50 (i.e., the N host data sub-blocks 52 and the M checksum sub-blocks 54) to the other nodes 26 of the cluster 42, and acknowledges completion of the write command 36 to the host computer 22 prior to flushing the dirty cache block to the data storage assembly 30.

Such operation reduces perceived I/O latency for the write command 36 since acknowledgement of the write command 36 is sent before the block of host data 38 is written out to the data storage assembly 30. Furthermore, such operation provides robust and reliable cache protection and can enable savings of network bandwidth as well as cache memory space vis-à-vis a conventional naïve cache protection approach.

In some arrangements, the controller 82 is implemented by a set of processors (one or more processors) running a specialized application 86. The specialized application 86 is capable of being delivered to the data storage node 26 via a computer program product 88 having a non-transitory computer readable storage medium which stores instructions of the specialized application 86. Examples of suitable non-transitory computer readable storage media include tangible articles of manufacture and apparatus which store instructions in a non-volatile manner such as CD-ROM, flash memory, disk memory, tape memory, combinations thereof, and the like.

Figure 3:
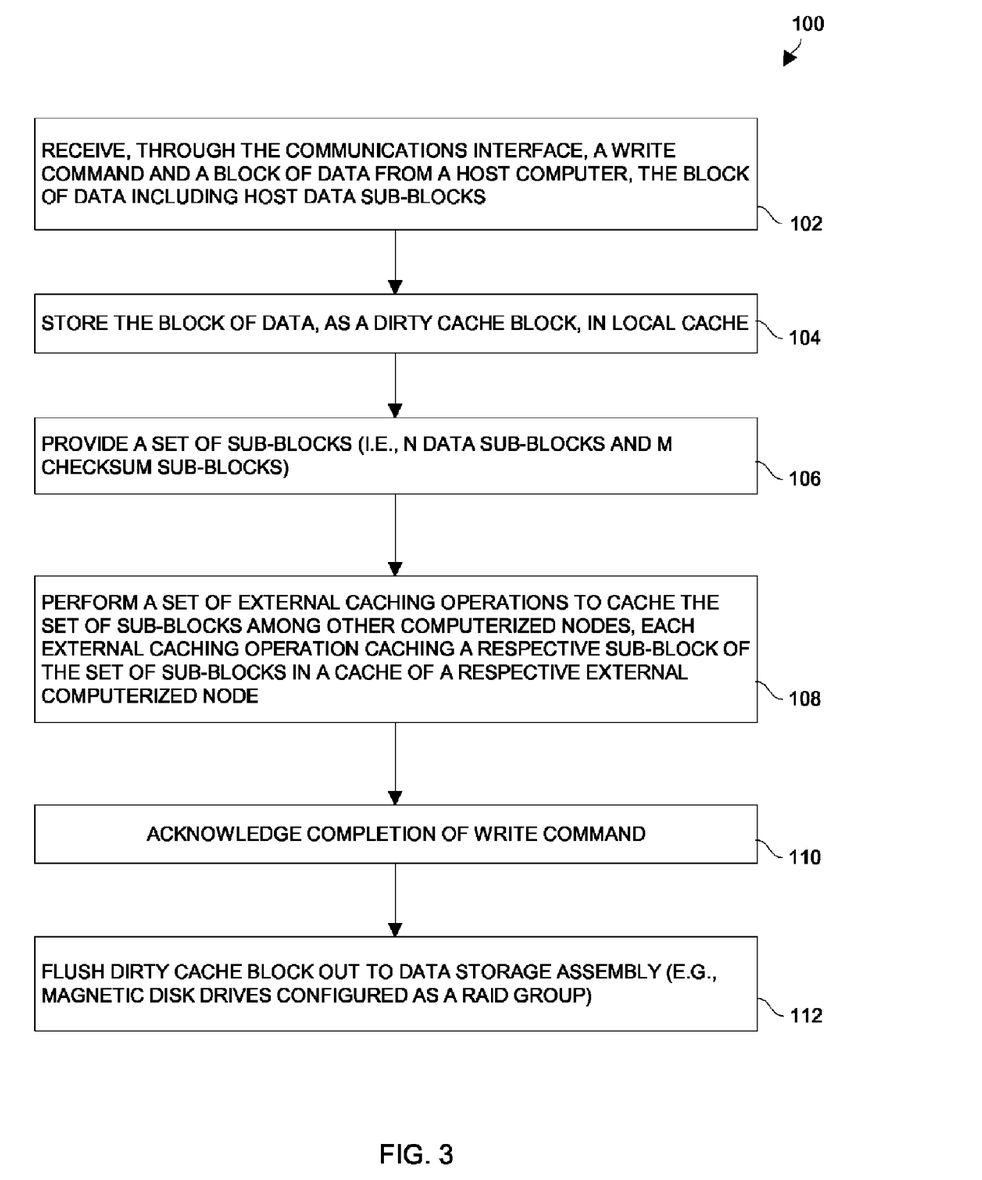
FIG. 3 is a flowchart of a procedure performed by a data storage node when protecting host data.

FIG. 3 is a flowchart of a procedure 100 performed by a data storage node 26 when protecting a block of host data 38. In step 102, the data storage node 26 receives, through the communications interface 80, a write command 36 and a block of host data 38 from a host computer 22. The block of host data 38 includes adjacent host data sub-blocks 52 (also see FIGS. 1-2).

In step 104, the data storage node 26 stores the block of host data 38, as a dirty cache block, in its local cache 84. At this point, if the node 26 were to fail, the block of host data 38 would be lost. Accordingly, the node 26 does not yet acknowledge completion of the write command 36.

In step 106, the data storage node 26 provides a set of sub-blocks 50. In particular, the node 26 inputs, from the block of host data 38, N host data sub-blocks 52 into a computation that results in M checksum sub-blocks 54 from the N host data sub-blocks 52. As a result, the node 26 now has N+M sub-blocks 50.

In step 108, the node 26 performs, through the communications interface 80, a set of external caching operations to cache the set of sub-blocks 50 among other nodes 26. Each external caching operation caches a respective sub-block 50 in a cache of a respective external computerized node 26. Upon confirmation that the external caching operations have successfully completed, the cached block of host data 38 is safely protected. In particular, the entire block of host data 38 is capable of being recovered from any N sub-blocks 50.

In step 110, the data storage node 26 acknowledges completion of the write command 36 to the host computer 22 prior to flushing the dirty cache block out to disk. This write-back caching behavior provides a reduction in I/O latency compared to write-back caching using a conventional naïve cache protection approach.

In step 112, the data storage node 26 flushes the dirty cache block in the data storage assembly 30. As a result, the block of host data 38 is safely stored in persistent storage (e.g., magnetic disk drives). Further details will now be provided with reference to FIG. 4.

Figure 4:
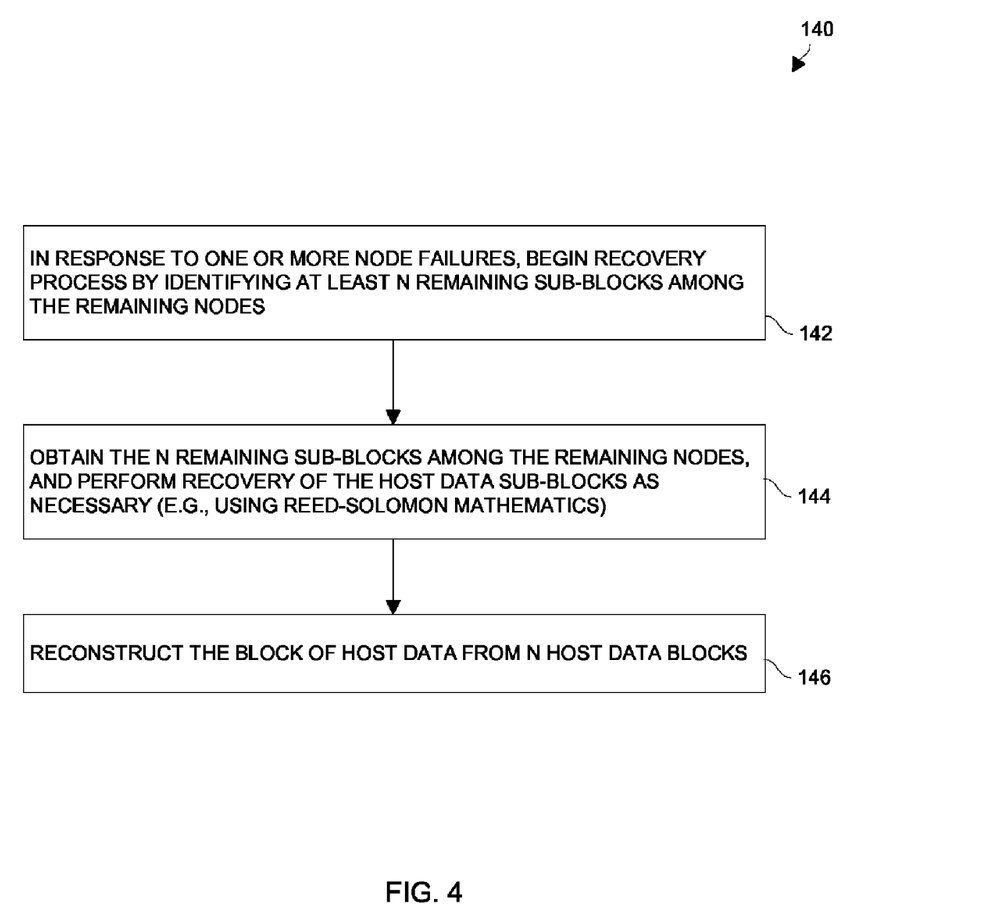
FIG. 4 is a flowchart of a procedure performed by a data storage node when recovering host data.

FIG. 4 is a flowchart of a procedure 140 which is performed in response to one or more node failures of the cluster 42. It should be understood that such reconstruction is only necessary if another data storage node 26 had cached an original block of host data 38 but failed prior to flushing the original block of host data 38 out to disk. For example, reconstruction would be appropriate if a node 26 performed steps 102 through 110 of the procedure 100 but then failed prior to completing step 112 (also see FIG. 3).

In step 142, the recovery node 26 detects the failure situation and determines that it is responsible for reconstructing the block of host data 38 from at least N remaining sub-blocks 50. To begin the recovery process, the recovery node 26 identifies the locations of the remaining sub-blocks 50 among the remaining nodes 26. It should be understood that one of the sub-block 50 may already reside in the local cache of the recovery node 26.

In step 144, the recovery node 26 obtains at least N sub-blocks 50 from the remaining nodes 26 (perhaps one of the sub-blocks 50 already residing in local cache), and computes any lost host data sub-blocks 52 from the available host data sub-blocks 52 and the available checksum sub-blocks 54. If the particular host data sub-block 52 already exists, it is unnecessary to re-compute that host data sub-block 52. It is possible that there are no lost host data sub-blocks 52 if all of the nodes 26 caching the host data sub-blocks 52 are still operational.

However, if one or more of the host data sub-blocks 52 has been lost, the node 26 systematically recovers the lost host data sub-blocks 52. In the context of Reed-Solomon mathematics, the node 26 finds the inverse matrix for an N×N matrix consisting of the corresponding identity matrix row or Vandermonde matrix row for which the host data or checksum sub-blocks 50 are available and then performs matrix multiplication on the vector consisting of available host data sub-blocks 52 and checksum sub-blocks 54 in order to recover all of the host data sub-blocks 52.

In some arrangements, the number of possible inverse matrices is limited and thus the inverse matrices can be pre-computed. As a result, recovery is simply a matrix by vector multiplication over a Galois Field and can implemented using a table lookup. At the completion of step 144, all of the N host data sub-blocks 52 are now available.

In step 144, the node 26 reconstructs the block of host data 38 from the N host data sub-blocks 52. As a result, the block of host data 38 is now fully reassembled and can be safely stored in a non-volatile manner on the data storage assembly 30. Further details of how the various sub-blocks are generated and distributed will now be provided by way of an example and with reference to FIG. 5.

Figure 5:
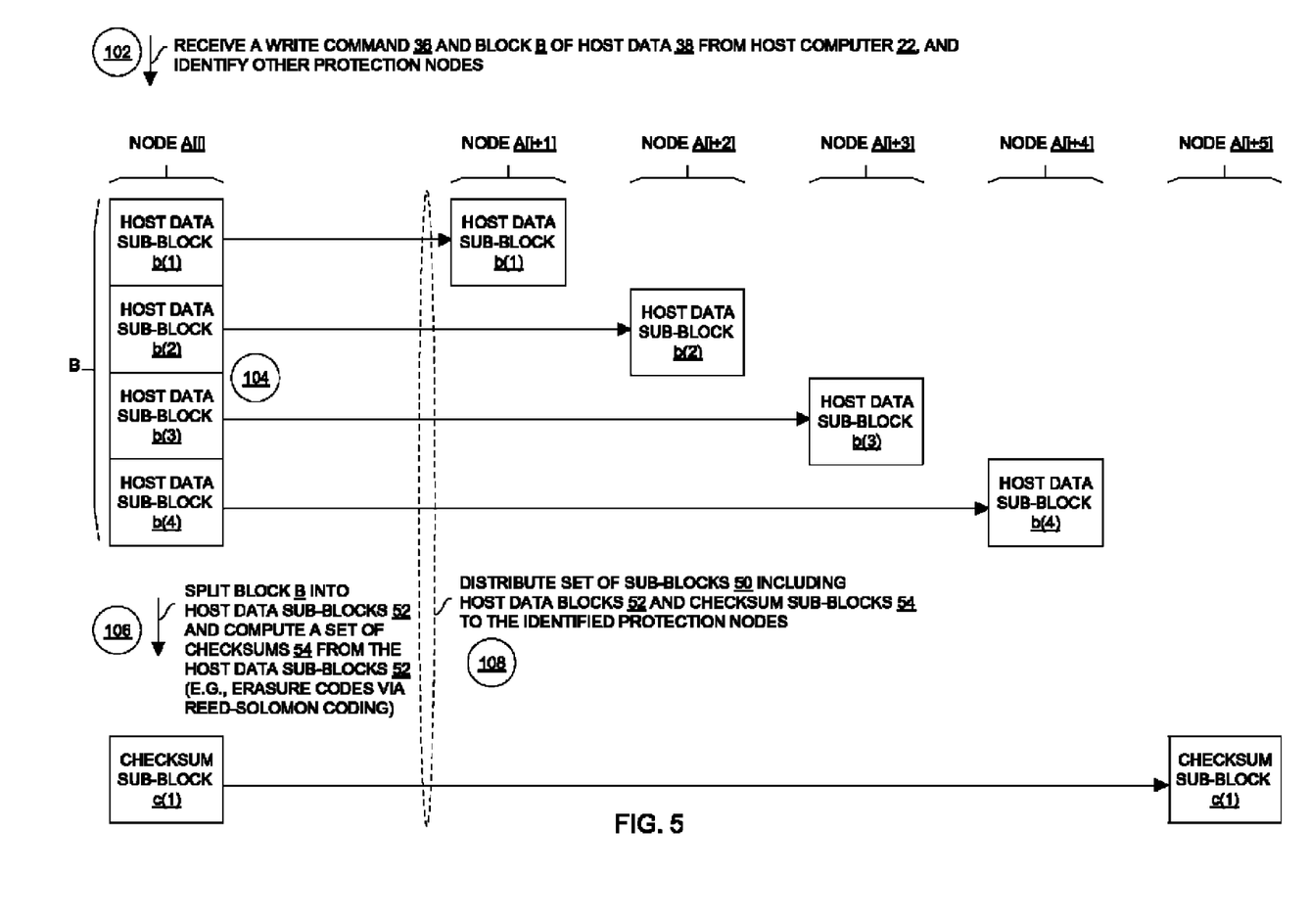
FIG. 5 is a block diagram of a first example illustrating how sub-blocks can be distributed among data storage nodes of the data storage environment of FIG. 1.

FIG. 5 shows, in the context of an example embodiment, how a data storage cluster 42 provides cache protection for blocks of host data (also see FIGS. 1-2). In the example of FIG. 5, the number of data storage nodes in the cluster is eight (i.e., X=8) and the cluster 42 provides level 2 cache protection, i.e., the cluster 42 is capable of withstanding up to 2 arbitrary node failures while protecting cached host data. Additionally, each node is constructed and arranged to partition each block of host data into four host data sub-blocks (i.e., N=4, and each sub-block is 0.25 blocks in size) and to derive one checksum sub-block (i.e., M=1) from the four host data sub-blocks of that block of host data before distributing the sub-blocks (i.e., the host data and checksum sub-blocks) to other nodes in the cluster 42.

For this example, the following definitions are set forth:
B is the block of host data that needs to be protected (size is power of 2),
$b(1), \ldots, b(N)$ are the host data sub-blocks in B that are used as Reed-Solomon inputs for checksum generation,
$c(1), \ldots, c(M)$ are the checksum blocks computed using Reed-Solomon mathematics on $b(1), \ldots, b(N)$,
X is number of nodes in the data storage cluster (although only six nodes are shown in FIG. 5 since only six nodes participate in protecting block B),
$A[i]$ is the ith node in the cluster (zero based index)

Initially, the node $A[i]$ receives a write command and block B of host data from one of the host computers 22 (also see step 102 in FIG. 3). Node $A[i]$ safely caches block B in its local cache 84 (also see step 104 in FIG. 3), and identifies N+M protection nodes. Such identification can be represented as follows:
locate N+M protection nodes from the X nodes of the cluster in accordance with Node $A[(i+j) \% X]$ for $j=1, 2, \ldots, N+M$ Next, node $A[i]$ splits block B into four host data sub-blocks 52, and computes a checksum sub-block 54 based on the host data sub-blocks 54 (also see step 106 in FIG. 3). This can be represented as follows:
split block B into host data sub-blocks $b(1), b(2), b(3), b(4)$
compute the checksum sub-block $c(1)$ from the host data sub-blocks $b(1), b(2), b(3), b(4)$ using Reed-Solomon (details omitted)
note that the bytes in the sub-blocks can be striped/interleaved within block B to improve CPU caching if required (the trade off is encoding efficiency vs. recovery efficiency).

Then, node $A[i]$ distributes the four host data sub-blocks 52 and the checksum sub-block 54 to the other protection nodes (also see step 108 in FIG. 3). This can be represented as follows:
Node[i] safely maintains entire block B in local cache, i.e., all of the host data sub-blocks $b(1), b(2), b(3), b(4)$ (previous step 104)
Node[(i+1)%8] safely caches host data sub-block $b(1)$
Node[(i+2)%8] safely caches host data sub-block $b(2)$
Node[(i+3)%8] safely caches host data sub-block $b(3)$
Node[(i+4)%8] safely caches host data sub-block $b(4)$
Node[(i+5)%8] safely caches checksum sub-block $c(1)$ At this point, the cluster 42 is able to withstand a failure of up to two arbitrary nodes (i.e., level 2 cache protection). In particular, it should be understood that recovery of block B is only necessary if node $A[i]$ sustains a failure. Along these lines, even if any or all of the other nodes of the cluster 42 fails, block B remains fully intact in node $A[i]$ and thus reconstruction of block B is unnecessary.

For write-back caching, the node 26 acknowledges completion of the write command (step 110 of FIG. 3) upon confirmation that the protection sub-blocks 50 have been safely cached in the other nodes 26 of the cluster 42. The node 26 ultimately flushes block B out to disk (step 112 of FIG. 3) to complete the formal write operation to disk. Further details will now be provided with reference to FIG. 6.

Figure 6:
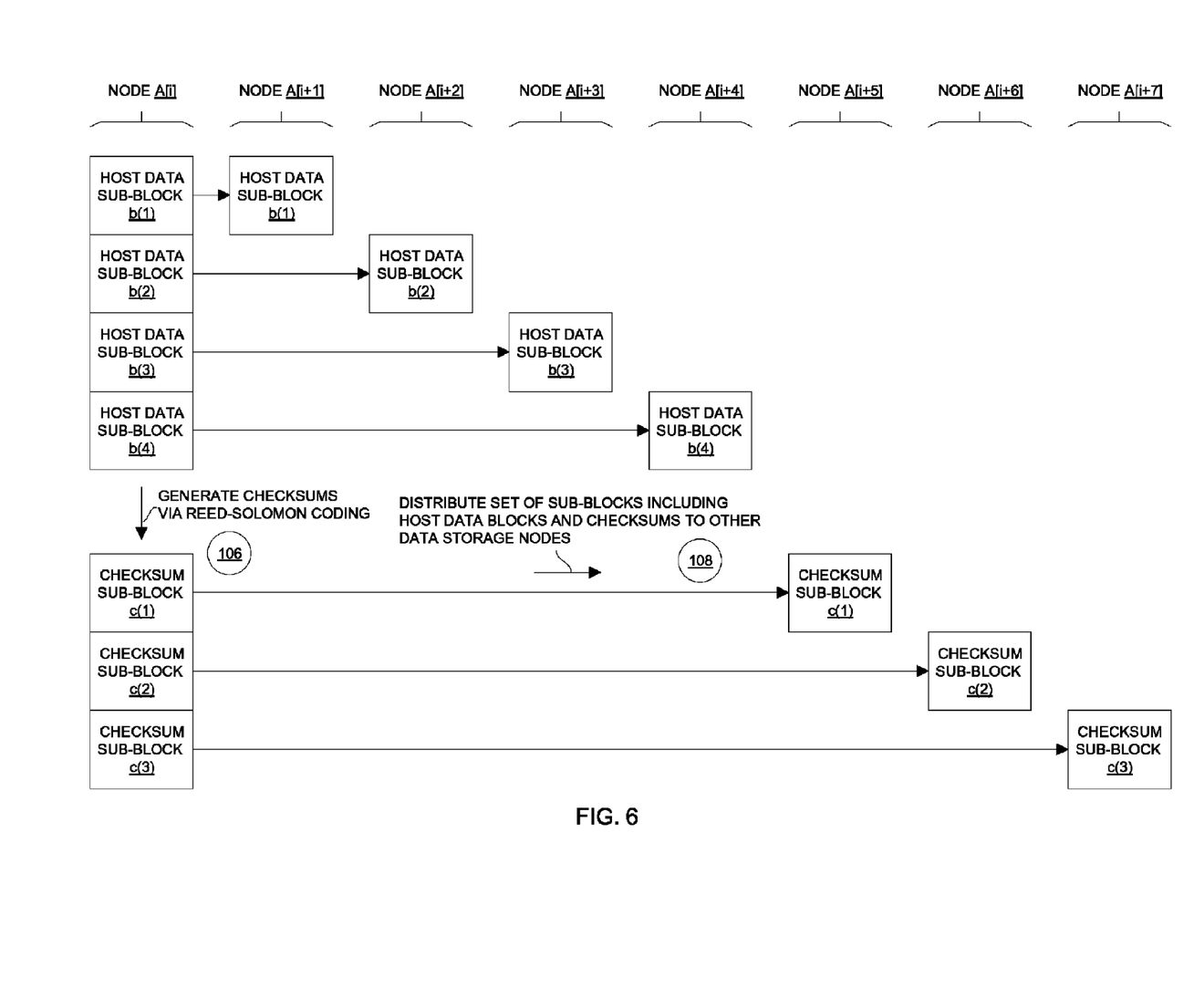
FIG. 6 is a block diagram of a second example illustrating how sub-blocks can be distributed among data storage nodes of the data storage environment of FIG. 1.

FIG. 6 shows, in the context of another example embodiment, how a data storage cluster provides cache protection for blocks of host data. The example of FIG. 6 is similar to that of FIG. 5 except that the example of FIG. 6 provides level 4 protection, i.e., the cluster 42 can withstand up to four node failures while maintaining cache protection. Again, in this example, the number of data storage nodes in the cluster is eight (i.e., X=8), and each node is constructed and arranged to partition each block of host data into four host data sub-blocks (i.e., N=4, and each sub-block is 0.25 blocks in size). However, each node is further constructed and arranged to derive three checksum sub-blocks (i.e., M=3) from the four host data sub-blocks of that block of host data before distributing these protection sub-blocks (i.e., the host data and checksum sub-blocks) to other nodes in the cluster.

As shown in FIG. 6, node A[i] splits block B into four host data sub-blocks 52, and computes three checksum sub-blocks 54 based on the host data sub-blocks 54 (also see step 106 in FIG. 3). This can be represented as follows:

split block B into host data sub-blocks b(1), b(2), b(3), b(4)

compute the checksum sub-blocks c(1), c(2), c(3) from the host data sub-blocks b(1), b(2), b(3), b(4) using Reed-Solomon (details omitted)

note that the bytes in the sub-blocks can be striped/interleaved within block B to improve CPU caching if required (the trade off is encoding efficiency vs. recovery efficiency).

Subsequently, node A[i] distributes the four host data sub-blocks 52 and the three checksum sub-blocks 54 to the other protection nodes (also see step 108 in FIG. 3). This can be represented as follows:

Node[i] safely maintains entire block B in local cache, i.e., all of the host data sub-blocks b(1), b(2), b(3), b(4) (previous step 104)

Node[(i+1)%8] safely caches host data sub-block b(1)

Node[(i+2)%8] safely caches host data sub-block b(2)

Node[(i+3)%8] safely caches host data sub-block b(3)

Node[(i+4)%8] safely caches host data sub-block b(4)

Node[(i+5)%8] safely caches checksum sub-block c(1)

Node[(i+6)%8] safely caches checksum sub-block c(2)

Node[(i+7)%8] safely caches checksum sub-block c(3)

Accordingly, the cluster 42 is able to withstand a failure of up to four arbitrary nodes (i.e., level 4 cache protection). In particular, the original block B is capable of being fully recovered from any four protection sub-blocks 50 (i.e., any combination of four host data sub-blocks and checksum sub-blocks) for high reliability.

It should be understood that with Reed-Solomon mathematics, double fault protection (encoding and recovery) can be computed very efficiently using only XOR operations. Triple fault protection can be computed with XOR operations and bit shifting. Moreover, protection beyond triple fault protection can be performed using table lookup.

It should be further understood that the above-described techniques offer effective cache protection but using less cache memory and network bandwidth than a conventional naïve cache protection approach. A cost comparison for various configurations is summarized in Table 1 where:

RS(N,M)=Reed-Solomon with N input host data sub-blocks 52 and M checksum sub-blocks 54

P=Level of cache protection, i.e., protection against any M+1 node failures

TABLE 1

| | | | | | Naïve Cache Protection Approach | |
|---|---|---|---|---|---|---|
| Improved Cache Protection Technique | | | | | | |
| Nodes | Protection Sub-blocks | RS(N,M) | P | Cost | Layout | Cost |
| 4, 8 | b(1),b(2),c(1) | RS(2,1) | 2 | 1.50 | B,B | 2.00 |
| 8 | b(1),b(2),b(3),b(4),c(1) | RS(4,1) | 2 | 1.25 | B,B | 2.00 |
| 8 | b(1),b(2),c(1),c(2) | RS(2,2) | 3 | 2.00 | B,B,B | 3.00 |
| 8 | b(1),b(2),b(3),b(4), c(1),c(2) | RS(4,2) | 3 | 1.50 | B,B,B | 3.00 |
| 8 | b(1),b(2),b(3),b(4), c(1),c(2),c(3) | RS(4,3) | 4 | 1.75 | B,B,B,B | 4.00 |

As described above, improved techniques protect cached host data 38 by distributing, among a set of nodes 26, only portions of the host data 38 in combination with a set of checksums 54. In particular, to protect a block of host data 38, the techniques involve splitting the block of host data 38 into N equally-sized, non-overlapping host data sub-blocks 52 and computing M checksum sub-blocks 54 from these N host data sub-blocks 52. The resulting N+M sub-blocks 50 (i.e., N host data sub-blocks 52 and M checksum sub-blocks 54) are then distributed across the set of nodes 26 with each node 26 remotely caching one of the N+M sub-blocks 50. The M checksums 54 are computed via application of error correcting mathematics so that the checksums 54 are the same size as the host data sub-blocks 52 and so that the entire block of host data 38 can be reconstructed from any combination of N sub-blocks 50. Accordingly, the entire block of host data 38 is capable of being recovered after a failure as long as there are at least N cached sub-blocks 50 remaining. Such techniques can consume less bandwidth and less cache memory space vis-à-vis the conventional naïve cache protection approach.

While various embodiments of the invention have been particularly shown and described, it will be understood by those skilled in the art that various changes in form and details may be made therein without departing from the spirit and scope of the invention as defined by the appended claims.

For example, it should be understood that four and eight node clusters 42 were described above for illustration purposes only. Other numbers of nodes 26 can be utilized as well (e.g., 5, 6, 7, 9, 10, and so on).

Additionally, it should be understood that the particular application of Reed-Solomon coding to cache protection can be independent of any RAID level which is implemented in back-end storage. That is, the data storage assembly 30 is capable of implementing different data protection schemes.

Moreover, it should be understood that the above-described data protection improvements were described above in the context of data storage nodes 26 which operate as front-ends to persistent storage. In other arrangements, the data protection improvements are simply implemented in random access memory (RAM), in direct attached storage (DAS), in network attached storage (NAS), in solid-state drives (SSD), and the like. Such implementations, improvements and enhancements are intended to belong to various embodiments of the invention.

What is claimed is:
1. A local computerized node, comprising:
a communications interface to connect to a host computer and a set of external computerized nodes;
a local cache; and
a controller coupled to the communications interface and the local cache, the controller being constructed and arranged to:

receive, through the communications interface, a block of data from the host computer, the block of data including data sub-blocks, store the block of data, as a dirty cache block, in the local cache, and perform, through the communications interface, a set of external caching operations to cache a set of sub-blocks in the set of external computerized nodes, each external caching operation caching a respective sub-block of the set of sub-blocks in a cache of a respective external computerized node, the set of sub-blocks including (i) the data sub-blocks of the block of data from the host computer and (ii) a set of checksums derived from the data sub-blocks of the block of data from the host computer.

2. A local computerized node as in claim 1, further comprising:

a storage interface coupled to the controller, the storage interface being constructed and arranged to connect to a set of non-volatile storage devices; and wherein the controller is constructed and arranged to store, through the storage interface, the block of data in the set of non-volatile storage devices after performing the set of external caching operations.

3. A local computerized node as in claim 2 wherein the set of non-volatile storage devices includes magnetic disk drives arranged to implement a particular RAID (redundant array of inexpensive disks) level; and wherein the controller, when storing the block of data, is constructed and arranged to write the block of data to the magnetic disk drives in accordance with the particular RAID level.

4. A local computerized node as in claim 2 wherein the controller is further constructed and arranged to:

generate a set of Reed-Solomon error correcting codes as the set of checksums prior to performing the set of external caching operations.

5. A computer program product including a non-transitory computer readable storage medium which stores a set of instructions to protect host data, the set of instructions, when run on a processor of a local computerized node, causing the local computerized node to:

receive, at the local computerized node, a block of data from a host computer, the block of data including data sub-blocks;

store the block of data, as a dirty cache block, in a local cache of the local computerized node; and perform a set of external caching operations to cache a set of sub-blocks in a set of external computerized nodes in communication with the local computerized node, each external caching operation caching a respective sub-block of the set of sub-blocks in a cache of a respective external computerized node, the set of sub-blocks including (i) the data sub-blocks of the block of data from the host computer and (ii) a set of checksums computed from the data sub-blocks of the block of data from the host computer.

6. A computer program product as in claim 5 wherein the local computerized node connects to a set of non-volatile storage devices; and wherein the set of instructions, when run on the processor of the local computerized node, further cause the local computerized node to:

store the block of data in the set of non-volatile storage devices after performing the set of external caching operations.

7. A method of protecting host data, the method comprising:

receiving, at a local computerized node, a block of data from a host computer, the block of data including data sub-blocks;

storing the block of data, as a dirty cache block, in a local cache of the local computerized node; and performing a set of external caching operations to cache a set of sub-blocks in a set of external computerized nodes in communication with the local computerized node, each external caching operation caching a respective sub-block of the set of sub-blocks in a cache of a respective external computerized node, the set of sub-blocks including (i) the data sub-blocks of the block of data from the host computer and (ii) a set of checksums generated from the data sub-blocks of the block of data from the host computer.

8. A method as in claim 7 wherein the local computerized node connects to a set of non-volatile storage devices; and wherein the method further comprises:

storing the block of data in the set of non-volatile storage devices after performing the set of external caching operations.

9. A method as in claim 8 wherein the set of non-volatile storage devices includes magnetic disk drives arranged to implement a particular RAID (redundant array of inexpensive disks) level; and wherein storing the block of data includes:

writing the block of data to the magnetic disk drives in accordance with the particular RAID level.

10. A method as in claim 9 wherein the local computerized node receives the block of data from the host computer as part of a write operation; and wherein the method further comprises:

acknowledging completion of the write operation to the host computer after performing the set of external caching operations and prior to writing the block of data to the magnetic disk drives in accordance with the particular RAID level.

11. A method as in claim 8, further comprising:

after the local computerized node has failed, recovering the block of data from respective sub-blocks in the caches of the respective external computerized nodes.

12. A method as in claim 11 wherein recovering the block of data includes:

restoring the block of data from less than all of the data sub-blocks of the and at least one checksums derived from the data sub-blocks.

13. A method as in claim 8, further comprising:

generating, at the local computerized node, a set of Reed-Solomon error correcting codes as the set of checksums prior to performing the set of external caching operations.

14. A method as in claim 13 wherein each data sub-block has a predefined size which is an integer multiple of a size of the block of data; and wherein generating the set of Reed-Solomon error correcting codes includes:

applying a set of functions to the data sub-blocks to derive the set of Reed-Solomon error correcting codes, each Reed-Solomon error correcting code having the predefined size which is the integer multiple of the size of the block of data.

15. A method as in claim 7 wherein each data sub-block is less than a complete copy of the block of data from the host computer.

16. A method as in claim 15 wherein the local computerized node and the set of external computerized nodes forms a data storage cluster which performs read and write operations using write-back caching on behalf of a set of host computers.

17. A method as in claim 16 wherein the block of data includes N data sub-blocks;

wherein the set of checksums includes M checksums, N and M being different integers, M being less than N, M being greater than zero, and N being greater than zero;

wherein the data storage cluster includes N+M computerized nodes; and wherein the method further comprises:

after a failure of at least the local computerized node of the data storage cluster, recovering the block of data from sub-blocks cached by remaining non-failed computerized nodes of the data storage cluster.

18. A method as in claim 17 wherein recovering the block of data from the sub-blocks cached by the remaining non-failed computerized nodes of the data storage cluster includes:

encountering a failure of M+1 computerized nodes, and restoring the block of data from N remaining non-failed computerized nodes of the data storage cluster.

19. A method as in claim 18 wherein N+M is at least three (3); wherein N is at least two (2); and wherein M is at least one (1).

20. A method as in claim 18 wherein restoring the block of data from the N remaining non-failed computerized nodes includes reconstructing the block of data from any combination of N data or checksum sub-blocks.

* * * * *